United States Patent
Hsu

(10) Patent No.: US 7,112,368 B2
(45) Date of Patent: Sep. 26, 2006

(54) POLY(DIOXYTHIOPHENE)/POLY(ACRYLAMIDOALKYSLUFONIC ACID) COMPLEXES

(75) Inventor: Che-Hsiung Hsu, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 37 days.

(21) Appl. No.: 10/282,463

(22) Filed: Oct. 29, 2002

(65) Prior Publication Data

US 2003/0118829 A1 Jun. 26, 2003

Related U.S. Application Data

(60) Provisional application No. 60/338,757, filed on Nov. 6, 2001.

(51) Int. Cl.
*C08L 41/00* (2006.01)
*H01B 1/12* (2006.01)

(52) U.S. Cl. .................. 428/402; 252/500; 524/458; 524/521; 525/189; 525/206; 525/284; 525/328.2; 525/328.5

(58) Field of Classification Search ............. 428/411.1, 428/522, 402; 252/500; 524/458, 521; 525/189, 525/206, 284, 328.2, 328.5
See application file for complete search history.

(56) References Cited

U.S. PATENT DOCUMENTS

| | | | |
|---|---|---|---|
| 4,552,927 A | 11/1985 | Warren | |
| 4,959,430 A | 9/1990 | Jonas et al. | |
| 5,035,926 A | 7/1991 | Jonas et al. | |
| 5,247,190 A | 9/1993 | Friend et al. | |
| 5,286,413 A | 2/1994 | Hannecart et al. | |
| 5,300,575 A | 4/1994 | Jonas et al. | |
| 5,317,169 A | 5/1994 | Nakano et al. | |
| 5,378,402 A | 1/1995 | Cross et al. | |
| 5,489,400 A | 2/1996 | Liu et al. | |
| 5,705,888 A | 1/1998 | Staring et al. | |
| 5,766,515 A | 6/1998 | Jonas et al. | |
| 5,986,400 A | 11/1999 | Staring et al. | |
| 5,994,496 A | 11/1999 | Van Haare et al. | |
| 6,010,645 A | 1/2000 | Angelopoulos et al. | |
| 6,083,635 A | 7/2000 | Jonas et al. | |

FOREIGN PATENT DOCUMENTS

| | | |
|---|---|---|
| EP | A 443861 A2 * | 8/1991 |
| EP | 0 440 957 B1 | 3/1996 |
| GB | 2 124 635 A | 2/1984 |
| WO | WO 00/06665 | 2/2000 |

OTHER PUBLICATIONS

Kim, B.C. et al., Incorporation of novel polyelectrolyte dopants into conducting polymers, Reactive & Functional Polymers, 2000, 245-258, 44, Elsevier Science B.V.
A. J. Sharpe, Jr. et al., Improved Cationic Conductive Polymer, Colgon Corp., Pittsburgh, PA, Coating Conference [Proceedings], pp.83-87, 1981, ISSN 0354-2771.

* cited by examiner

*Primary Examiner*—Ramsey Zacharia

(57) ABSTRACT

The present invention is directed to poly(dioxythiophene)/poly(acrylamidoalkylsulfonic acid) complexes and the oxidative polymerization process for making them. Aqueous dispersions of these poly(dioxythiophene)/poly(acrylamidoalkylsulfonic acid) complexes are useful for forming transparent electrically conductive organic layers comprised of such complexes.

6 Claims, No Drawings

POLY(DIOXYTHIOPHENE)/POLY(ACRYLAMIDOALKYSLUFONIC ACID) COMPLEXES

FIELD OF THE INVENTION

This invention relates to a process for making poly(dioxythiophene)/poly(acrylamidoalkylsulfonic acid) complexes, to such complexes and aqueous dispersions of such complexes and to electronic devices with a transparent electrically conductive organic layer comprised of such complexes.

BACKGROUND OF THE INVENTION

Electrically conductive polymers have been found to be useful in electronic devices such as light-emitting diodes (LEDs), photodetectors and photovoltaic cells. It is well known to use a layer of conductive polymer, such as poly(3,4-ethylenedioxythiophene) (PEDOT), between the inorganic anode and the light-emitting layer. The conductive polymer layer is variously referred to as part of a bilayer anode, a hole-injection layer or a buffer layer. Such systems have been described in, for example, Jonas et al., U.S. Pat. No. 5,766,515.

Useful synthetic procedures for the preparation of a poly(dioxythiophene) such as PEDOT are well known. For example, the dioxythiophene monomer can be treated with ammonium persulfate or potassium peroxydisulfate in excess hydrochloric acid in water. Such reactions are known as oxidative polymerization, wherein monomers such as thiophenes are oxidized in the presence of a protonic acid. This reaction results in a positively charged poly(dioxythiophene), with the charge being balanced with the anion from the acid. Such processes have been described in U.S. Pat. No. 5,035,926, U.S. Pat. No. 5,300,575, U.S. Pat. No. 6,083,635 and European Patent application 440 957.

The thickness of the conductive polymer layer needed in the above-mentioned electronic devices depends to some extent on the surface roughness of the conductive layer. Thicker layers are needed as the surface roughness increases. In order to prepare smooth and uniform layers, it is desirable to have dispersions of the conductive polymers with smaller particle size. Moreover, it is desirable to find new polymer systems with electrical properties that provide better performance in the conductive polymer layer.

SUMMARY OF THE INVENTION

The present invention provides a process for the oxidative polymerization of dioxythiophene monomer having the Formula I below:

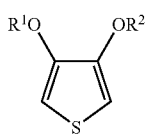

(I)

wherein $R^1$ and $R^2$ are independently selected from H or a $C_1$–$C_6$ alkyl or together form an optionally substituted $C_1$–$C_6$ alkylene radical.

Combinations of such monomers can also be used. The process comprises carrying out the polymerization in water in the presence of a poly(acrylamidoalkylsulfonic acid) comprising a repeating unit having Formula II:

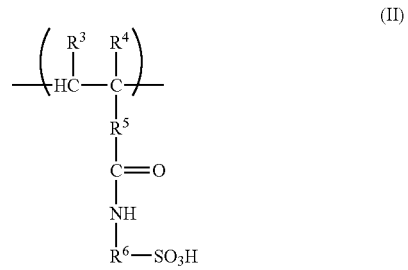

(II)

wherein $R^3$ and $R^4$ are independently selected from H, a $C_1$–$C_6$ alkyl or phenyl; $R^5$ is a single bond or a $C_1$–$C_6$ alkylene; and $R^6$ is a $C_1$–$C_{12}$ alkylene;

to produce a poly(dioxythiophene)/poly(acrylamidoalkylsulfonic acid) complex comprising the poly(acrylamidoalkylsulfonic acid) and a poly(dioxythiophene) comprising a repeating unit having Formula III:

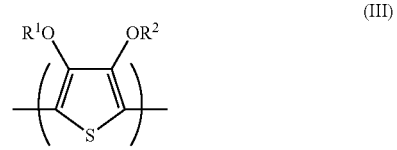

(III)

wherein $R^1$ and $R^2$ are those of the monomer with Formula I above.

This invention also provides the novel poly(dioxythiophene)/poly(acrylamidoalkylsulfonic acid) complex and an aqueous dispersion of this complex.

This invention also provides an electronic device containing a conductive organic layer comprised of the poly(dioxythiophene)/poly(acrylamidoalkylsulfonic acid) complex.

Preferably the dioxythiophene is 3,4-ethylenedioxythiophene and therefore the poly(dioxythiophene) is poly(3,4-ethylenedioxythiophene). Preferably, the poly(acrylamidoalkylsulfonic acid) is poly(acrylamido-2-methyl-1-propanesulfonic acid) comprising a repeating unit having Formula IV below:

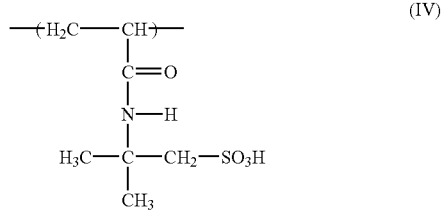

(IV)

DETAILED DESCRIPTION OF THE INVENTION

The poly(dioxythiophene) of the present invention is formed by oxidative polymerization of the starting dioxythiophene monomers. In the process of the invention, the oxidative polymerization of the dioxythiophene monomers is carried out in aqueous solution in the presence of a poly(acrylamidoalkylsulfonic acid) and preferably with known oxidizing agents such as those described in U.S. Pat. No. 5,035,926, U.S. Pat. No. 5,300,575, U.S. Pat. No. 5,766,515 and U.S. Pat. No. 6,083,635.

In particular, suitable oxidizing agents include but are not limited to alkali persulfate such as sodium and potassium persulfates. Any of the oxidizing agents for the oxidative polymerization of pyrrole, which are described, for example, in J. Am. Soc. 85, 454 (1963), are also suitable. For practical reasons, it is preferred to use commercially available oxidizing agents, for example iron(III) salts, such as $FeCl_3$, $Fe(ClO_4)_3$ and the iron(III) salts of organic acids and inorganic acids containing organic residues, also $H_2O_2$, $K_2CR_2O_7$, ammonium persulfate, alkali perborates, potassium permanganate and copper salts, such as copper tetrafluoroborate. In addition, it has been found that air and oxygen, optionally in the presence of catalytic quantities of metal ions, such as iron, cobalt, nickel, molybdenum and vanadium ions, may advantageously be used as oxidizing agents. The use of the persulfates and the iron(III) salts of organic acids and inorganic acids containing organic residues has the major industrial advantage that they are not corrosive. Examples of iron(III) salts of inorganic acids containing organic residues are the iron(III) salts of sulfuric acid semiesters of C 1–20 alkanols, for example, the Fe(III) salt of lauryl sulfate. The following are mentioned as examples of iron(III) salts of organic acids: the Fe(III) salts of C 1–30 allyl sulfonic acids, such as methane or dodecane sulfonic acid; aliphatic C 1–20 carboxylic acids, such as 2-ethylhexyl carboxylic acid; aliphatic perfluorocarboxylic acids, such as trifluoroacetic acid and perfluorooctanoic acid; aliphatic dicarboxylic acids, such as oxalic acid and, above all, aromatic, optionally C 1–20-alkyl-substituted sulfonic acids, such as benzenesulfonic acid, p-toluenesulfonic acid and dodecyl benzenesulfonic acid. Mixtures of the above-mentioned Fe(III) salts of organic acids may also be used.

Typically, an aqueous solution of poly(acrylamidoalkylsulfonic acid) and an oxidizing agent and an aqueous solution of dioxythiophene monomer are mixed and stirred. A catalyst such as ferric sulfate is often added to catalyze the oxidative polymerization. The polymerization time may vary depending on the temperature, the oxidizing agent used, the molecular weight of the poly(acrylamidoalkylsulfonic acid) and the volume of the solutions. Typically, polymerization is allowed to proceed at ambient temperature, about 22° C., for about 24 to 48 hours. Longer times are needed for higher molecular weight poly(acrylamidoalkylsulfonic acid).

The product of the polymerization reaction is an ion pair complex of positively charged poly(dioxythiophene) and poly(acrylamidoalkylsulfonic acid) anion, referred to herein as the poly(dioxythiophene)/poly(acrylamidoalkylsulfonic acid) complex.

It is advantageous to treat the produced complex with anion and cation exchange resins. These ion exchange resins are added to the aqueous dispersion to quench the polymerization and remove metal ions. The resins are then removed by filtration.

Preferably, the poly(dioxythiophene)/poly(acrylaoalkylsulfonic acid) complex is isolated from the reaction mixture. The isolated complex can then be added to water at the desired concentration to form an aqueous dispersion suitable for use in forming conductive polymer layers.

The poly(acrylamidoalkylsulfonic acid) acid is a high molecular weight polymer. By "high molecular weight" is meant a polymer having an average molecular weight greater than 20,000. Preferably, the molecular weight is greater than 300,000.

The poly(dioxythiophene)/poly(acrylamidoalkylsulfonic acid) complex particles produced by the process of the invention have an average particle size of less than 1 µm, considerably smaller than complexes previously known and used for conductive polymer layers, such as, for example the poly(dioxythiophene)/poly(styrenesulfonic acid) complex discussed in U.S. Pat. No. 5,300,575, U.S. Pat. No. 5,766, 515 and U.S. Pat. No. 6,083,635. The smaller poly(dioxythiophene)/poly(acrylamidoalkylsulfonic acid) complex particle size facilitates the deposition of smooth uniform layers of conductive polymer. Small particle size is also economically advantageous to facilitate filtration during the production of layers of this conductive polymer in electronic devices.

The present invention also relates to an electronic device comprising an organic active layer sandwiched between two electrical contact layers, wherein a layer of conductive polymer comprising the polydioxythiophene/poly(acrylamidoalkylsulfonic acid) complex of the invention is positioned between the active layer and the electrical contact layer which functions as an anode. The device has an inorganic anode layer and a cathode layer. Adjacent to the anode is the layer comprising the conductive polymer made by the method of the present invention. Adjacent to the cathode is an optional layer comprising an electron transport material. Between the conductive polymer layer and the cathode (or optional electron transport layer) is the organic active layer.

The device generally also includes a support, which can be adjacent to the anode or the cathode. Most frequently, the support is adjacent to the inorganic anode. The support can be flexible or rigid, organic or inorganic. Generally, glass or flexible organic films are used as a support.

The inorganic anode is an electrode that is particularly efficient for injecting or collecting positive charge carriers. The anode can be a metal, a mixed metal, an alloy, a metal oxide or a mixed-metal oxide. Suitable metals include the Group 11 metals, the metals in Groups 4, 5, and 6, and the Group 8–10 transition metals. If the anode is to be light-transmitting, mixed-metal oxides of Groups 12, 13 and 14 metals, such as indium-tin-oxide, are generally used. The IUPAC numbering system is used throughout, where the groups are numbered from left to right as 1–18 (CRC Handbook of Chemistry and Physics, $81^{st}$ Edition, 2000).

The inorganic anode layer is usually applied by a physical vapor deposition process. The term "physical vapor deposition" refers to various deposition approaches carried out in vacuo. Thus, for example, physical vapor deposition includes all forms of sputtering, including ion beam sputtering, as well as all forms of vapor deposition such as electron beam evaporation. A specific form of physical vapor deposition that is useful is rf magnetron sputtering.

The conductive polymer layer can be applied using any conventional means, including spin-coating, casting, and printing, such as gravure printing. The conductive polymer can also be applied by ink jet printing or thermal patterning. Before application, the poly(dioxythiophene)/poly(acrylamidoalkylsulfonic acid) complex can be added to water to form the aqueous dispersion of the invention. Alternatively, the poly(dioxythiophene)/poly(acrylamidoalkylsulfonic acid) complex can be dispersed or dissolved in organic polar or nonpolar solvents. In general, the concentration of the aqueous dispersion is in the range of 0.1 to 5.0% by weight of the poly(dioxythiophene)/poly(acrylamidoalkylsulfonic acid) complex, based on the total weight of the dispersion; preferably 0.5–3.0% by weight.

In general, the inorganic anode and the conductive polymer layer will be patterned. It is understood that the pattern may vary as desired. The layers can be applied in a pattern by, for example, positioning a patterned mask or photoresist on the first flexible composite barrier structure prior to applying the first electrical contact layer material. Alternatively, the layers can be applied as an overall layer and subsequently patterned using, for example, a photoresist and wet chemical etching. As discussed above, the conductive polymer layer can also be applied in a pattern by ink jet printing, lithography or thermal transfer patterning. Other processes for patterning that are well known in the art can also be used.

Depending upon the application of the device, the active layer can be a light-emitting layer that is activated by an applied voltage (such as in a light-emitting diode), a layer of material that responds to radiant energy and generates a signal with or without an applied bias voltage (such as in a photodetector). Examples of photodetectors include photoconductive cells, photoresistors, photoswitches, phototransistors, and phototubes, and photovoltaic cells, as these terms are describe in Markus, John, *Electronics and Nucleonics Dictionary*, 470 and 476 (McGraw-Hill, Inc. 1966).

When the device is a light-emitting diode, the active layer will emit light when sufficient bias voltage is applied to the electrical contact layers. The light-emitting active layer may contain any organic electroluminescent or other organic light-emitting materials. Such materials can be small molecule materials such as those described in, for example, Tang, U.S. Pat. No. 4,356,429, Van Slyke et al., U.S. Pat. No. 4,539,507, the relevant portions of which are incorporated herein by reference. Alternatively, such materials can be polymeric materials such as those described in Friend et al. (U.S. Pat. No. 5,247,190), Heeger et al. (U.S. Pat. No. 5,408,109), Nakano et al. (U.S. Pat. No. 5,317,169), the relevant portions of which are incorporated herein by reference. Preferred electroluminescent materials are semiconductive conjugated polymers. An example of such a polymer is poly(p-phenylenevinylene) referred to as PPV. The light-emitting materials may be dispersed in a matrix of another material, with and without additives, but preferably form a layer alone. The active organic layer generally has a thickness in the range of 50–500 nm. In order to prevent cross-talk between lines or pixels of the patterned anode, electrical conductivity of the buffer layers should be as low as possible without jeopardizing the light emission properties of the device. It has been found that when the layer of conductive polymer comprises the polydioxythiophene/poly (acrylamidoalkylsulfonic acid) complex of the invention, the layer of conductive polymer has a much lower conductivity and the light-emitting diode shows a higher emission efficiency at a given brightness and requires a lower applied operating voltage to achieve that given brightness than when the poly(dioxythiophene)/poly(styrenesulfonic acid) complex is used for the layer of conductive polymer.

When the active layer is incorporated in a photodetector, the layer responds to radiant energy and produces a signal either with or without a biased voltage. Materials that respond to radiant energy and is capable of generating a signal with a biased voltage (such as in the case of a photoconductive cells, photoresistors, photoswitches, phototransistors, phototubes) include, for example, many conjugated polymers and electroluminescent materials. Materials that respond to radiant energy and is capable of generating a signal without a biased voltage (such as in the case of a photoconductive cell or a photovoltaic cell) include materials that chemically react to light and thereby generate a signal. Such light-sensitive chemically reactive materials include for example, many conjugated polymers and electro- and photo-luminescent materials. Specific examples include, but are not limited to, MEH-PPV ("Optocoupler made from semiconducting polymers", G. Yu, K. Pakbaz, and A. J. Heeger, *Journal of Electronic Materials*, Vol. 23, pp 925–928 (1994); and MEH-PPV Composites with CN-PPV ("Efficient Photodiodes from Interpenetrating Polymer Networks", J. J. M. Halls et al. (Cambridge group) *Nature* Vol. 376, pp. 498–500, 1995).

The active layer containing the active organic material can be applied from solutions by any conventional means, including spin coating, casting, and printing. The active organic materials can be applied directly by vapor deposition processes, depending upon the nature of the materials. It is also possible to apply an active polymer precursor and then convert to the polymer, typically by heating.

The cathode is an electrode that is particularly efficient for injecting or collecting electrons or negative charge carriers. The cathode can be any metal or nonmetal having a lower work function than the first electrical contact layer (in this case, an anode). Materials for the second electrical contact layer can be selected from alkali metals of Group 1 (e.g., Li, Cs), the Group 2 (alkaline earth) metals, the Group 12 metals, the lanthanides, and the actinides. Materials such as aluminum, indium, calcium, barium, and magnesium, as well as combinations, can be used.

The cathode layer is usually applied by a physical vapor deposition process. In general, the cathode layer will be patterned, as discussed above in reference to the anode layer and conductive polymer layer. Similar processing techniques can be used to pattern the cathode layer.

The optional layer between the cathode and active layer can function both to facilitate electron transport, and also serve as a buffer layer or confinement layer to prevent quenching reactions at layer interfaces. Preferably, this layer promotes electron mobility and reduces quenching reactions. Examples of electron transport materials for the optional layer include metal chelated oxinoid compounds, such as tris(8-hydroxyquinolato)aluminum ($Alq_3$); phenanthroline-based compounds, such as 2,9-dimethyl-4,7-diphenyl-1,10-phenanthroline (DDPA) or 4,7-diphenyl-1,10-phenanthroline (DPA), and azole compounds such as 2-(4-biphenylyl)-5-(4-t-butylphenyl)-1,3,4-oxadiazole (PBD) and 3-(4-biphenylyl)-4-phenyl-5-(4-t-butylphenyl)-1,2,4-triazole (TAZ).

It is known to have other layers in organic electronic devices. For example, there can be a layer between the conductive polymer layer and the active layer to facilitate positive charge transport and/or band-gap matching of the layers, or to function as a protective layer. Similarly, there can be additional layers between the active layer and the cathode layer to facilitate negative charge transport and/or band-gap matching between the layers, or to function as a protective layer. Layers that are known in the art can be used. In addition, any of the above-described layers can be made of two or more layers. Alternatively, some or all of inorganic anode layer, the conductive polymer layer, the active layer, and cathode layer, may be surface treated to increase charge carrier transport efficiency. The choice of materials for each of the component layers is preferably determined by balancing the goals of providing a device with high device efficiency.

The device can be prepared by sequentially depositing the individual layers on a suitable substrate. Substrates such as glass and polymeric films can be used. In most cases the anode is applied to the substrate and the layers are built up from there. However, it is possible to first apply the cathode to a substrate and add the layers in the reverse order. In general, the different layers will have the following range of thicknesses: inorganic anode, 50–500 nm, preferably 100–200 nm; conductive polymer layer, 5–250 nm, preferably 20–200 nm; light-emitting layer, 1–100 nm, preferably 10–80 nm; optional electron transport layer, 5–100 nm, preferably 20–80 nm; cathode, 20–1000 nm, preferably 30–500 nm.

EXAMPLES OF THE INVENTION AND COMPARATIVE EXPERIMENTS

Comparitive Experiment A

Various measurements were used to characterize the complexes made in the Examples of the Invention and Comparative Experiments and the organic layers comprised of the complexes.

The aqueous dispersions of the polymer complexes produced were subjected to filtration to determine if the particles of the polymer complex would pass through the filters. Three different sizes of syringe filters were used for the filtration test. The most coarse syringe filter used was a 5.0 µm Millex®-SV from Millipore Corp. (Bedford, Mass., USA). The second syringe filter used was a 1.2 µm GF/C filter from Whatman Inc. (Clifton, N.J., USA). The third syringe filter used was a 1.0 µm polysulfone filter from Whatman Inc. A selected syringe filter was placed on the exit nozzle of a plastic syringe and the aqueous dispersion of the polymer complex was then put into the syringe. Pressure was then applied to the dispersion with the syringe plunger. Filterability was judged by how easily the dispersion went through the filter and whether the color of the liquid that passed through the filter lightened, thereby indicating that the particles of the polymer complex failed to pass through the filter.

The particle size of the particles of polymer complex was determined by a dynamic light scattering technique. The instrument used is a Brookhaven Instrument B12000 goniometer equipped with a Brookhaven Instrument BI9000AT Digital Autocorrelator. The incident light of 632.8 nm was provided by a Spectra Physics He/Ne laser (50 mw). Measurements were done on very dilute dispersions of the polymer complex. 0.1 ml of the dispersions made in the Examples and Comparative Experiments were diluted to 10 ml. The dilute dispersion was prepared in culture tubes and measurement was done at 90° scattering angle and ambient temperature. The culture tubes were placed in an index matching fluid (decalin) to reduce flare from the cell walls. Five separate runs of 2 minutes duration were done for each sample. From the correlation function the software calculated the particle size and, in addition, the polydispersity (i.e., breadth of particle size distribution).

The polymer complexes of Comparative Experiment A and Example 1 were used in buffer layers of conductive polymer between the anode and the light-emitting layer of light-emitting diodes. For these LEDs, device current vs. applied voltage, light emission intensity vs. applied voltage, and efficiency were measured with a Keithley 236 source-measure unit from Keithley Instrument Inc. (Cleveland, Ohio), and a S370 optometer with a calibrated silicon photodiode from UDT Sensor, Inc. (Hawthorne, Calif.).

This Comparative Experiment demonstrates the oxidative polymerization of ethylenedioxythiophene in the presence of poly(styrenesulfonic acid) (PSSA) to produce a poly(ethylenedioxythiophene)/poly(styrenesulfonic acid) (PEDOT/PSSA) complex and the properties of the PEDOT/PSSA complex. A solution of ferric sulfate was made by dissolving 0.3246 g of ferric sulfate hydrate (Aldrich cat. #30,771-8, Sigma-Aldrich Corp., St. Louis, Mo., USA) in deionized water to produce a solution with a total weight of 39.4566 g. 2.28 g of this ferric sulfate solution was mixed with 300 g of deionized water, 10.00 g of PSSA (30 wt % PSSA, 70,000 molecular weight, cat# 08770, from Poly-Sciences, Inc., Warmington, Pa., USA) and 1.72 g sodium persulfate (Fluka, cat. # 71899, Sigma-Aldrich Corp., St. Louis, Mo., USA) in a plastic bottle. The ferric sulfate acts as a catalyst for the polymerization and the sodium persulfate is an oxidizing agent for the oxidative polymerization of ethylenedioxythiophene. The mixture was swirled and then placed in a 3-necked 500 ml flask equipped with a thermal well for a thermocouple. The mixture was stirred for with a stirring paddle powered by an air-driven overhead stirrer while 0.63 ml of 3,4-ethylenedioxythiophene (Baytron-M®) obtained from Bayer, Pittsburgh, Pa., USA) was added to the PSSA-containing mixture. The polymerization of the 3,4-ethylenedioxythiophene was allowed to proceed for 24 hours at room temperature, i.e., about 22° C. As a result of the polymerization, the clear liquid changed to a dark color liquid, which is the color of the PEDOT/PSSA complex dispersed in water. The as-synthesized PEDOT/PSSA complex dispersion was tested for filterability with a 5.0 µm Millex®-SV syringe filter from Millipore Corp. (Bedford, Mass., USA). Only clear colorless liquid went through the filter with a high hand pressure exerted to a syringe plunger, thereby indicating that the PEDOT/PSSA complex particles were too large to pass through.

One half of the aqueous dispersion of the PEDOT/PSSA complex, which amounted to about 158 g, was further treated with two ion exchange resins. One is a cation exchanger, sodium sulfonate of crosslinked polystyrene, (Lewatit® S100 WS, obtained from Bayer, Pittsburgh, Pa., USA). The other is an anion exchanger, free base/chloride of tertiary/quaternary amine of crosslinked polystyrene, (Lewatit® MP62 WS, obtained from Bayer, Pittsburgh, Pa., USA). 53 g of Lewatit® S100 WS and 51 g of Lewatit® MP62 WS were each washed with deionized water until there was no color in the water. The two washed resins were then filtered before being mixed with the 158 g of the aqueous dispersion of the PEDOT/PSSA complex. The mixture was stirred with a magnetic stirrer for 8 hours. The resins were removed by filtration. It was determined that the aqueous dispersion of the resin-treated PEDOT/PSSA complex contained 1.2 wt % solid based on a gravimetric analysis. The aqueous dispersion of the resin-treated PEDOT/PSSA was then tested for filterability with a 5.0 µm Millex®-SV syringe filter from Millipore Corp. (Bedford, Mass., USA) and a 1.2 µm GF/C syringe filter from Whatman Inc. (Clifton, N.J., USA). The dispersion passed through the 5.0 µm Millex®-SV syringe filter, but only clear colorless liquid passed through the 1.2 µm GF/C syringe filter with a high hand pressure exerted on the syringe plunger. The average particle size of the resin-treated PEDOT/PSSA complex particles was measured by light scattering as described above and found to be 1.12 µm (average of five measurements with standard deviation of 0.04 µm) with polydispersity of 0.40. The filterability and particle size data are summarized in Table I.

The resin-treated PEDOT/PSSA complex was then tested for electrical conductivity and light emission properties. Commercially available indium tin oxide (ITO)/glass plates having ITO layers 100 to 150 nm thick were cut into samples 30 mm×30 mm in size. The ITO layers were subsequently etched with oxygen plasma. The ITO on the glass substrates to be used for electrical conductivity measurements were etched into a series of parallel lines of ITO to be used as electrodes. The ITO on the substrates to be made into LEDs for light emission measurement were etched into a 15 mm×20 mm layer of ITO to serve as the anode. The aqueous dispersion of the resin-treated PEDOT/PSSA complex was spin-coated onto each of the ITO/glass substrates at a spinning speed of 1200 rpm. The resulting PEDOT/PSSA complex layer was about 140 nm thick. The layer quality was not uniform. The PEDOT/PSSA complex coated ITO/glass substrates were dried in nitrogen at 90° C. for 30 minutes.

Electrical conductivity of the PEDOT/PSSA complex layer was determined by measuring the resistance between two electrodes and was calculated to be $6.1 \times 10^{-3}$ S/cm based on the resistance, the thickness of the conductive layer and the distance between the two electrodes used to measure the resistance. The conductivity is shown in Table II.

For light emission measurements, the PEDOT/PSSA complex layer was then top-coated with a super-yellow emitter poly(substituted-phenylene vinylene) (PDY 131 obtained from Covion Company, Frankfurt, Germany) to serve as the active electroluminescent (EL) layer. The thickness of the EL layer was approximately 70 nm. All film thicknesses were measured with a TENCOR 500 Surface Profiler. For the cathode, Ba and Al layers were vapor deposited on top of the EL layer under a vacuum of $1.3 \times 10^{-4}$ Pa. The final thickness of the Ba layer was 3 nm; the thickness of the Al layer on top of the Ba layer was 300 nm. LED device performance was tested as follows. Measurements of current vs. applied voltage, light emission intensity vs. applied voltage, and light emission efficiency (candela/ampere-c/A) were measured with a Keithley 236 source-measure unit from Keithley Instrument Inc. (Cleveland, Ohio), and a S370 Optometer with a calibrated silicon photodiode (UDT Sensor, Inc., Hawthorne, Calif.). Five LED devices were tested by raising the applied voltage to obtain a light intensity of 200 cd/m². The average applied voltage to achieve this intensity was 5.0 volts and the average light efficiency was 5.4 cd/A as summarized in Table II.

Comparitive Experiment B

This Comparative Experiment demonstrates the oxidative polymerization of ethylenedioxythiophene in the presence of poly(styrenesulfonic acid) (PSSA) to produce a poly (ethylenedioxythiophene)/poly(styrenesulfonic acid) (PEDOT/PSSA) complex and the properties of the PEDOT/PSSA complex. The synthesis of the PEDOT/PSSA complex was carried out with a much smaller amount of ferric sulfate than that used in Comparative Experiment A. In addition, much smaller amounts of the two exchange resins were used to treat the PEDOT/PSSA complex.

A solution of ferric sulfate was made by dissolving 0.0938 g of ferric sulfate hydrate (Aldrich cat. # 30,771-8, Sigma-Aldrich Corp., St. Louis, Mo., USA) in deionized water to produce a solution with a total weight of 10.7627 g. 0.08 g of this ferric sulfate solution was mixed with 300.02 g of deionized water, 10.00 g of PSSA (30 wt % PSSA, 70,000 molecular weight, cat# 08770, from PolySciences, Inc., Warmington, Pa., USA) and 1.75 g sodium persulfate (Fluka, cat. # 71899, Sigma-Aldrich Corp., St. Louis, Mo., USA) in a plastic bottle. The mixture was swirled and then placed in a 3-necked 500 ml flask equipped with a thermal well for a thermocouple. The mixture was stirred for with a stirring paddle powered by an air-driven overhead stirrer while 0.63 ml of 3,4-ethylenedioxythiophene (Baytron-M® obtained from Bayer, Pittsburgh, Pa., USA) was added to the PSSA-containing mixture. The polymerization of the 3,4-ethylenedioxythiophene was allowed to proceed for 24 hours at room temperature, i.e., about 22° C. As a result of the polymerization, the clear liquid changed to a dark color liquid, which is the color of the PEDOT/PSSA complex dispersed in water. The as-synthesized PEDOT/PSSA complex dispersion was tested for filterability with a 5.0 µm Millex®-SV syringe filter from Millipore Corp. (Bedford, Mass., USA). Only clear colorless liquid passed through the filter with a high hand pressure exerted to a syringe plunger, thereby indicating that the PEDOT/PSSA complex particles were too large to pass through.

One half of the aqueous dispersion of the PEDOT/PSSA complex, which amounted to about 150 g, was further treated with the same two ion exchange resins used in Comparative Experiment A, Lewatit® S100 WS and Lewatit® MP62 WS. 7.57 g of Lewatit® S100 WS and 7.59 g of Lewatit® MP62 WS were each washed with deionized water until there was no color in the water. The two washed resins were then filtered before being mixed with the 150 g of the aqueous dispersion of the PEDOT/PSSA complex. The mixture was stirred with a twin roller for 21 hours. The resins were removed by filtration. The treated aqueous PEDOT/PSSA dispersion was then tested for filterability with a 5.0 µm Millex®-SV syringe filter. Only clear colorless liquid passed through the filter with a high hand pressure exerted on the syringe plunger. The average particle size of the resin-treated PEDOT/PSSA complex particles was measured by light scattering and found to be 2.91 µm (average of five measurements with standard deviation of 0.48 µm) with polydispersity of 0.48. The filterability and particle size data are summarized in Table I.

Example 1

This Example demonstrates the oxidative polymerization of ethylenedioxythiophene in the presence of poly(acrylamido-2-methyl-1-propanesulfonic acid) (PAAMPSA), to produce a poly(ethylenedioxythiophene)/poly(acrylamido-2-methyl-1-propanesulfonic acid) (PEDOT/PAAMPSA) complex and the properties of the PEDOT/PMMPSA complex.

2.28 g of the ferric sulfate solution prepared for Comparative Experiment A was mixed with 300.0 g of deionized water, 22.5 g of PAAMPSA (15 wt. % PMMPSA in water, Aldrich cat# 19,197-3, Sigma-Aldrich Corp., St. Louis, Mo., USA) and 1.72 g sodium persulfate (Fluka, cat. # 71899, Sigma-Aldrich Corp., St. Louis, Mo., USA) in a plastic bottle. The mixture was swirled and then placed in a 3-necked 500 ml flask equipped with a thermal well for a thermocouple. The mixture was stirred with a stirring paddle powered by an air-driven overhead stirrer while 0.63 ml of 3,4-ethylenedioxythiophene (Baytron-M®) was added to the In PAAMPSA-containing mixture. The polymerization of the 3,4-ethylenedioxythiophene was allowed to proceed for 24 hours at room temperature, i.e., about 22° C. As a result of the polymerization, the clear liquid changed to a dark color liquid, which is the color of the PEDOT/PAAMPSA complex dispersed in water. The as-synthesized PEDOT/PMMPSA complex dispersion was tested for filterability with a 5.0 µm Millex®-SV syringe from Millipore Corp. (Bedford, Mass., USA) and a 1.2 µm GF/C syringe filter from Whatman Inc. (Clifton, N.J., USA). The dispersion passed through both filters easily. The filterability results clearly show that the as-synthesized PEDOT/PAAMPSA complex particles are smaller than those made in Comparative Experiments A and B.

The entire aqueous dispersion of the PEDOT/PAAMPSA complex, was further treated with the same two ion exchange resins used in Comparative Experiment A, Lewatit® S100 WS and Lewatit® MP62 WS. 100.1 g of Lewatit® S100 WS and 99.5 g of Lewatit® MP62 WS were each washed with deionized water until there was no color in the water. The two washed resins were then filtered before being mixed with the aqueous dispersion of the PEDOT/PAAMPSA complex. The mixture was stirred with a magnetic stirrer for 15 hours. The resins were removed by filtration. It was determined that the aqueous dispersion of the resin-treated PEDOT/PAAMPSA complex contained 1.23 wt % solid based on a gravimetric analysis. The aqueous dispersion of the resin-treated PEDOT/PAAMPSA complex was then tested for filterability with a 5.0 µm Millex®-SV syringe filter, a 1.2 µm GF/C syringe filter from Whatman Inc. (Clifton, N.J., USA) and a 1.0 µm polysulfone filter from Whatman Inc. The dispersion easily passed through all three filters and there was no change in color. The filterability results show that the PEDOT/PAAMPSA complex particles are smaller than the PEDOT/PSSA complex particles prepared in Comparative Experiments A and B. The average particle size of the resin-treated PEDOT/PMMPSA complex particles was measured by light scattering as described above and found to be 0.46 µm (average of five measurements with standard deviation of 0.02 µm) with polydispersity of 0.20. The filterability and particle size data are summarized in Table I.

The resin-treated PEDOT/PMMPSA complex was then tested for electrical conductivity and light emission properties. ITO layers on glass slides were prepared for the two kinds of measurements as described in Comparative Experiment A. The aqueous dispersion of the resin-treated PEDOT/PMMPSA complex was spin-coated onto each of the ITO/glass substrates at a spinning speed of 1200 rpm. The resulting PEDOT/PAAMPSA complex layer was about 140 nm thick. The layers were very uniform, clearly of better quality than those prepared in Comparative Experiment A. The PEDOT/PMMPSA complex coated ITO/glass substrates were dried in nitrogen at 90° C. for 30 minutes.

Electrical conductivity of the PEDOT/PAAMPSA complex layer was measured as described above and was determined to be $1.6 \times 10^{-7}$ S/cm as shown in Table II. This conductivity is more than four orders of magnitude lower than the conductivity of the PEDOT/PSSA complex layer of Comparative Experiment A.

For light emission measurements, LEDs with the PEDOT/PMMPSA complex layer were prepared as described in Comparative Experiment A. LED device performance was tested as described in Comparative Experiment A. Five LED devices were tested by raising the applied voltage to obtain a light intensity of 200 cd/m². The average applied voltage to achieve this intensity was 3.8 volts and the average light efficiency was 8.2 cd/A as summarized in Table II. The operating voltage is much lower than that of the devices of Comparative Experiment A. The light emission efficiency is also much higher than that of the devices described of Comparative Experiment A.

Example 2

This Example demonstrates the oxidative polymerization of ethylenedioxythiophene in the presence of poly(acrylamido-2-methyl-1-propanesulfonic acid) (PAAMPSA), to produce a poly(ethylenedioxythiophene)/poly(acrylamido-2-methyl-1-propanesulfonic acid) (PEDOT/PMMPSA) complex and the properties of the PEDOT/PMMPSA complex. The synthesis of the PEDOT/PAAMPSA complex was carried out with a much smaller amount of ferric sulfate than that used in Example 1. In addition, much smaller amounts of the two exchange resins were used to treat the PEDOT/PAAMPSA complex.

A solution of ferric sulfate was made by dissolving 0.0497 g of ferric sulfate hydrate (Aldrich cat. # 30,771-8, Sigma-Aldrich Corp., St. Louis, Mo., USA) in deionized water to produce a solution with a total weight of 10.8606 g. 1.64 g of the ferric sulfate solution was mixed with 300.0 g of deionized water, 22.54 g of PAAMPSA (15 wt. % PAAMPSA in water, Aldrich cat# 19, 197-3, Sigma-Aldrich Corp., St. Louis, Mo., USA) and 1.72 g sodium persulfate (Fluka, cat. # 71899, Sigma-Aldrich Corp., St. Louis, Mo., USA) in a plastic bottle. The mixture was swirled and then placed in a jacketed, 3-necked 500 ml flask equipped with a thermal well for a thermocouple. A circulation liquid kept at about 22° C. was circulated through the reactor jacket. The mixture was stirred with a stirring paddle powered by an air-driven overhead stirrer while 0.63 ml of 3,4-ethylenedioxythiophene (Baytron-M®) was added to the PAAMPSA-containing mixture. The polymerization of the 3,4-ethylenedioxythiophene was allowed to proceed for 24 hours. As a result of the polymerization, the clear liquid changed to a dark color liquid, which is the color of the PEDOT/PAAMPSA complex dispersed in water. The as-synthesized PEDOT/PMMPSA complex dispersion was tested for filterability with a 5.0 µm Millex®-SV syringe filter, a 1.2 µm GF/C syringe filter from Whatman Inc. (Clifton, N.J., USA) and a 1.0 µm polysulfone filter from Whatman Inc. The dispersion easily passed through all three filters and there was no change in color. The filterability results clearly show that the as-synthesized PEDOT/PAAMPSA complex particles are smaller than those made in Comparative Experiments A and B. The average particle size of the as-synthesized PEDOT/PMMPSA complex particles was measured by light scattering as described above and found to be 0.57 µm (average of five measurements with standard deviation of 0.01 µm) with polydispersity of 0.21. The filterability and particle size data are summarized in Table I.

One half of the aqueous dispersion of the PEDOT/PMMPSA complex, which amounts to about 158 g, was further treated with the same two ion exchange resins used in Comparative Experiment A, Lewatit® S100 WS and Lewatit® MP62 WS. 7.57 g of Lewatit® S100 WS and 7.59 g of Lewatit® MP62 WS were each washed with deionized water until there was no color in the water. The two washed resins were then filtered before being mixed with the aqueous dispersion of the PEDOT/PAAMPSA complex. The mixture was stirred with a twin roller for 21.5 hours. The resins were removed by filtration. The aqueous dispersion of the resin-treated PEDOT/PAAMPSA complex was then tested for filterability with a 5.0 µm Millex®-SV syringe filter, a 1.2 µm GF/C syringe filter from Whatman Inc. (Clifton, N.J., USA) and a 1.0 µm polysulfone filter from Whatman Inc. The dispersion easily passed through all three filters and there was no change in color. The filterability results show that the PEDOT/PAAMPSA complex particles are smaller than the PEDOT/PSSA complex particles prepared in Comparative Experiments A and B. The filterability and particle size data are summarized in Table I.

TABLE 1

| Example or Comp. Expt. | Buffer Layer Polymer Complex | Filter Size | | | Particle size (μm) |
|---|---|---|---|---|---|
| | | 5.0 μm | 1.2 μm | 1.0 μm | |
| Comparative Experiment A | As-synthesized PEDOT/PSSA | Did not pass through | — | — | — |
| Comparative Experiment A | Resin-treated PEDOT/PSSA | Passed through | Did not pass through | — | 1.12 |
| Comparative Experiment B | As-synthesized PEDOT/PSSA | Did not pass through | — | — | — |
| Comparative Experiment B | Resin-treated PEDOT/PSSA | Did not pass through | — | — | 2.91 |
| Example 1 | As-synthesized PEDOT/PAAMPS A | Passed through | Passed through | — | — |
| Example 1 | Resin-treated PEDOT/PAAMPS A | Passed through | Passed through | Passed through | 0.46 |
| Example 2 | As-synthesized PEDOT/PAAMPS A | Passed through | Passed through | Passed through | 0.57 |
| Example 2 | Resin-treated PEDOT/PAAMPS A | Passed through | Passed through | Passed through | — |

TABLE 2

| Example or Comp. Expt. | Layer Quality | Voltage (V) @200 cd/m² | Efficiency (cd/A) @200 cd/m² | Conductivity (S/cm) |
|---|---|---|---|---|
| Comparative Experiment A | Not uniform | 5.0 | 5.4 | $6.1 \times 10^{-3}$ |
| Example 1 | Uniform | 3.8 | 8.2 | $1.6 \times 10^{-7}$ |

What is claimed is:

1. A poly(dioxythiophene)/poly(acrylamidoalkylsulfonic acid) complex having a particle size less than 1 micron, wherein:

(I) the poly(dioxythiophene) comprises a repeating unit having Formula III

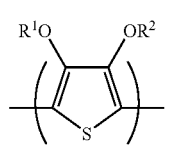
(III)

where $R^1$ and $R^2$ are independently selected from H or a $C_1$–$C_6$ alkyl or together form an optionally substituted $C_1$–$C_6$ alkylene radical, and the poly(acrylamidoalkylsulfonic acid) comprises a repeating unit having Formula II

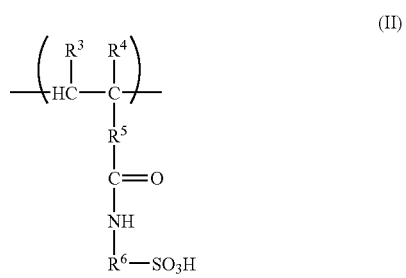
(II)

where $R^3$ and $R^4$ are independently selected from H, a $C_1$–$C_6$ alkyl or phenyl, $R^5$ is a single bond or a $C_1$–$C_6$ alkylene, and $R^6$ is a $C_1$–$C_{12}$ alkylene; and (ii) said complex is formed by the oxidative polymerization of a dioxythiophene monomer having Formula I

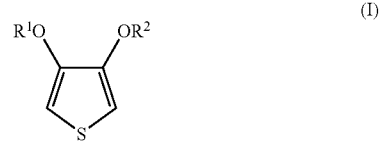
(I)

where $R^1$ and $R^2$ are independently selected from H or a $C_1$–$C_6$ alkyl or together form an optionally substituted $C_1$–$C_6$ alkylene radical, in water in the presence of the poly(acrylamidoalkylsulfonic acid).

2. The complex of claim 1, wherein said dioxythiophene is 3,4-ethylenedioxythiophene and said poly(dioxythiophene) is poly(3,4-ethylenedioxythiophene).

3. The complex of claim 2, wherein said poly(acrylamidoalkylsulfonic acid) is poly(acrylamido-2-methyl-1-propanesulfonic acid) comprising a repeating unit having Formula IV

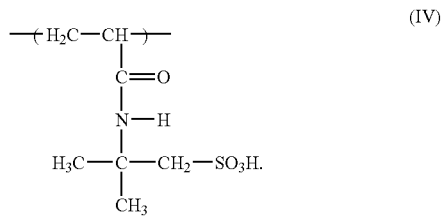
(IV)

4. An aqueous dispersion of a poly(dioxythiophene)/poly(acrylamidoalkylsulfonic acid) complex in water, wherein:

(i) the poly(dioxythiophene) comprises a repeating unit having Formula III

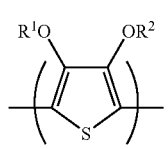
(III)

where $R^1$ and $R^2$ are independently selected from H or a $C_1$–$C_6$ alkyl or together form an optionally substituted $C_1$–$C_6$ alkylene radical, and the poly(acrylamidoalkylsulfonic acid) comprises a repeating unit having Formula II

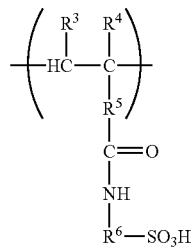

(II)

where $R^3$ and $R^4$ are independently selected from H, a $C_1$–$C_6$ alkyl or phenyl, $R^5$ is a single bond or a $C_1$–$C_6$ alkylene, and $R^6$ is a $C_1$–$C_{12}$ alkylene; and (ii) said complex is formed by the oxidative polymerization of a dioxythiophene monomer having Formula I

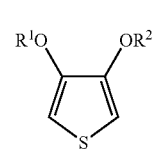

(I)

where $R^1$ and $R^2$ are independently selected from H or a $C_1$–$C_6$ alkyl or together form an optionally substituted $C_1$–$C_6$ alkylene radical, in water in the presence of the poly(acrylamidoalkylsulfonic acid);

and further wherein the complex has a particle size of less than 1 micron.

5. The aqueous dispersion of claim 4, wherein the poly(dioxythiophene) is poly(3,4-ethylenedioxythiophene).

6. The aqueous dispersion of claim 5, wherein the poly(acrylamidoalkylsulfonic acid) is poly(acrylamido-2-methyl-1-propanesulfonic acid).

* * * * *